Aug. 21, 1962 — A. RASCOV — 3,049,827
GATES
Filed Dec. 29, 1960 — 2 Sheets-Sheet 1

INVENTOR.
ANTHONY RASCOV
BY
H.C. Karel
ATTORNEY

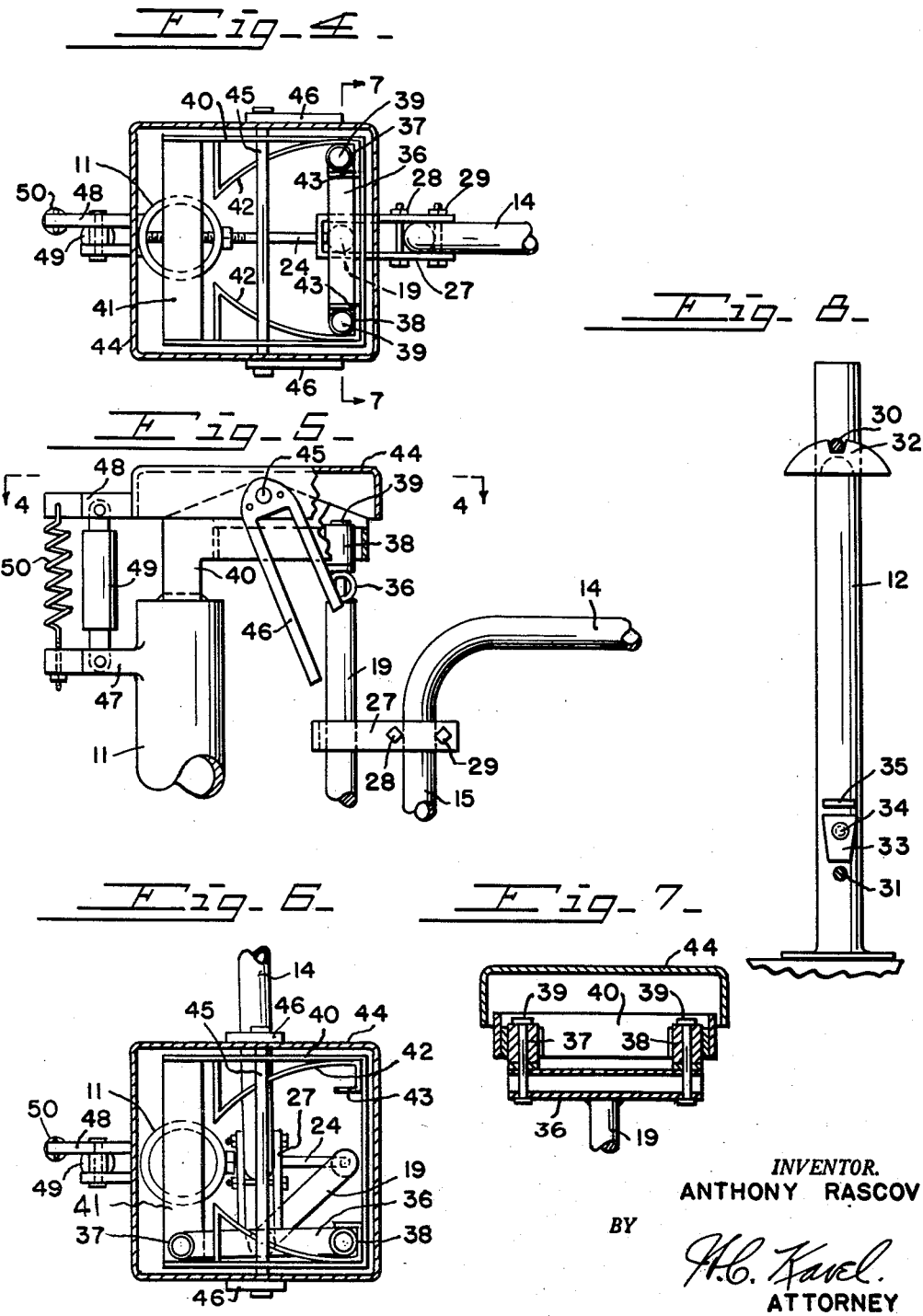

3,049,827
GATES

Anthony Rascov, 4303 Tabasco Road,
Clermont County, Ohio
Filed Dec. 29, 1960, Ser. No. 79,414
6 Claims. (Cl. 39—31)

This invention relates to an improved gate of novel construction provided with a bumper bar for automatically opening the gate upon contact by the bumper of an automobile and holding the gate open for a short period of time to permit the automobile to pass through and provided with means for closing the gate, which is operable in either direction.

The object of my invention is to provide a bumper actuated and gravity return gate.

A further object is to provide means to permit the gate to be rocked on pendulum points to start the gate in motion.

A further object is to provide means for limiting the outward movement of the gate.

A further object is to provide retarding means for holding the gate in open position for a limited time interval.

A further object is to provide means for urging the gate into closing action.

A further object is to provide means to prevent animals from pushing the gate open.

My invention will be further readily understood from the following description and claims, and from the drawings, in which latter:

FIG. 4 is an enlarged horizontal section of the pivotal end of the gate support, taken in the plane of the line 4—4 of FIG. 5.

FIG. 5 is a side view of the same, partly broken away.

FIG. 6 is a similar view to FIG. 4, with the gate open.

FIG. 7 is a detail section, taken in the plane of the line 7—7 of FIG. 4.

FIG. 8 is a vertical section, taken in the plane of the line 8—8 of FIG. 1.

Figure 1:
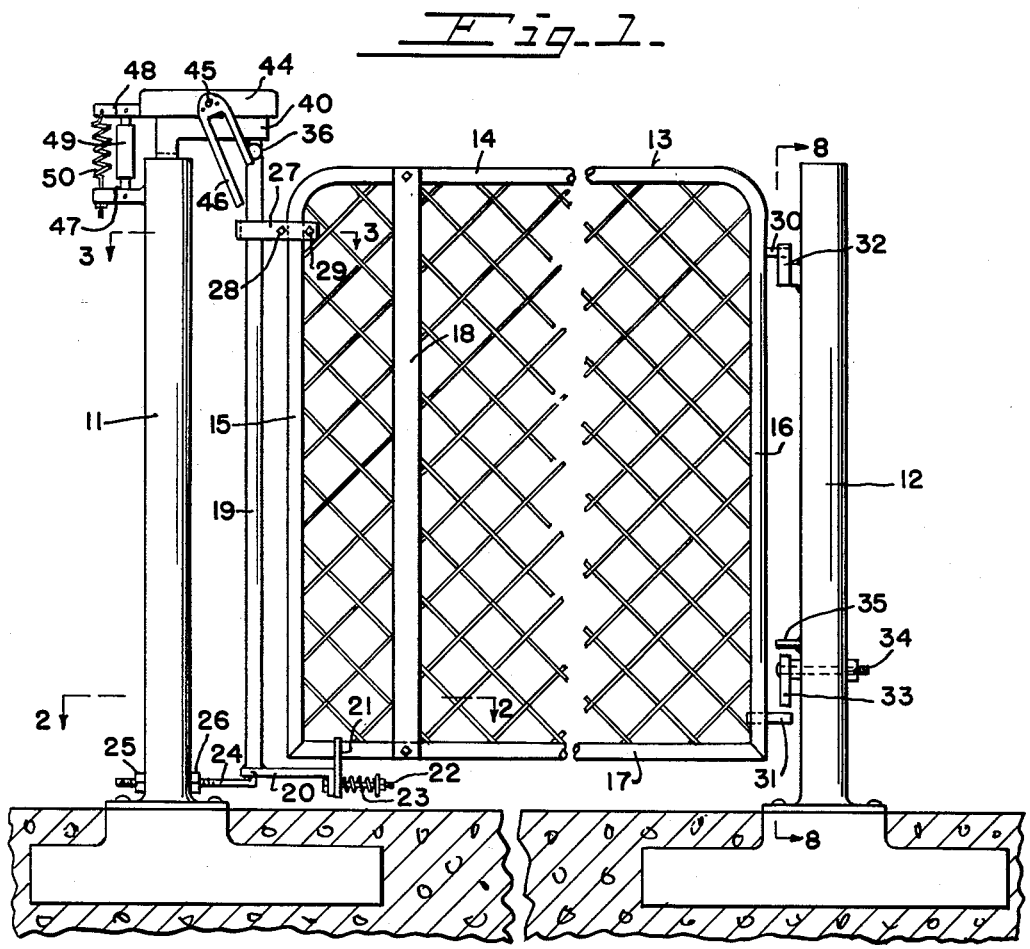
FIG. 1 is a front view of my improved gate, partly broken away.
Figure 2:
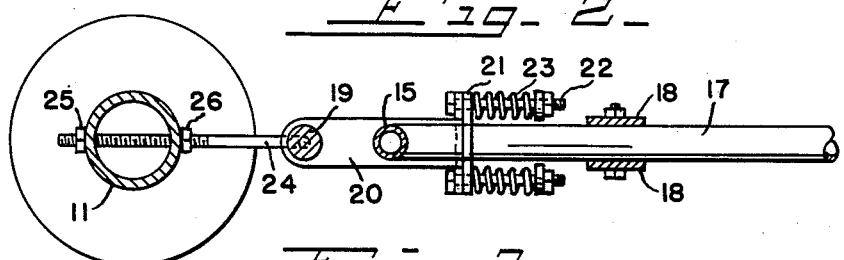
FIG. 2 is an enlarged detail section, taken in the plane of the line 2—2 of FIG. 1.
Figure 3:
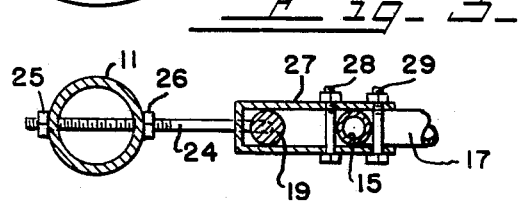
FIG. 3 is an enlarged detail section, taken in the plane of the line 3—3 of FIG. 1.

My improved gate is installed between a pair of posts 11 and 12 and comprises a tubular frame 13 with an upper portion 14, side portions 15 and 16 and a lower portion 17. A bumper bar 18 mounted near the hinge section of the gate extends from the upper portion 14 to the lower portion 17.

The gate is supported on an upright post 19 having a bar 20 welded to the base of the post and extending inwardly. A plate 21 secured to the lower portion 17 of the gate is connected to the bar 20 by means of bolts 22 extending from the bar 20 through the plate 21 with springs 23 interposed between the plate and the nuts on the bolts to form a shock absorbing expansion hinge. An adjustable pivot hinge 24 extends through the post 11 and is adjusted by means of nuts 25 and 26. The end of the bolt 24 extends upwardly to seat in the plate 20 to form a pivotal base hinge. Near the top of the gate is a band 27 clamped to the side member 15 by means of bolts 28 and 29 and extending around the post 19.

The side member 16 is provided with a pair of extending pins 30 and 31. The pin 30 engages a latch plate 32 on the post 12. A base latch 33 is pivoted on a pin 34 extending from the post 12 and a bar 35 above the latch limits the swinging movement of the latch. Pressure on the upper portion of the gate or lifting of the gate will not release the gate as the pin 31 will strike the base latch 33 preventing the pin 30 from disengaging from the latch 32. However, a bumping of the gate below the center of the gate by the bumper of an automobile against the bumper bar 18 will cause the gate to pivot or swing on the pin 30 and bar 27 with the plate 21 moving against the springs 23 causing the pin 31 to move away from the latch 33 and disengage the pin 30 from the latch 32, due to the movement of the gate which causes the gate to rise at the pin 30.

The upper end of the post 19 has a cross-bar 36 welded thereto and supports rollers 37 and 38 mounted on pins 39. A frame 40 is secured to the top of the post 11 as by welding the cross-bar 41 to the post. The frame 40 has roller guides 42 and forward stop flanges 43. A cover 44 is pivoted on the frame 40 by a rod 45 which has yokes 46 on the rod 45 and secured to the cover 44. These yokes are set at an angle and arranged to be engaged by the upper portion 14 of the gate.

Arms 47 and 48 extend rearwardly from the post 11 and cover 44. A hydraulic dash pot 49 and a spring 50 are secured to the arms 47 and 48.

The gate can be operated from either side by bumping the bumper bar 18 with the bumper of an automobile. As contact is made below the center of the gate, the lower portion of the gate swings, with the springs 23 and bolts 22 permitting the lower portion of the gate to swing and the pin 31 to clear the latch 33. Immediately the springs 23 which have been compressed react to cause the arm 20 to snap around causing a turning of the post 19 and starting the roller action at the top of the post 19 to lift the pin 30 from the latch 32. As the pin 30 leaves the keeper 32 and as the gate swings away on the pivot pin 24, the post 19 rotates causing one of the rollers 37 or 38 depending on the direction of swing to act as a pivot, with the other roller following the guide 42. As this action takes place the post 19 tilts for raising the outer portion of the gate which swings until the upper portion 14 of the gate engages the yoke 46 which rocks the housing 44 and the gate movement is arrested by the action of the dash pot 49, which will cause the gate to remain open for a short period of time, sufficient for the automobile to pass through the opening. The gate will return to closed position started by the action of the expanded spring 50 and as the outer end of the gate was raised by the tilting of the post 19, the gate is returned to closed position by gravity. As the gate reaches the closed position the pin 31 will strike the pivoted latch 33 and as the pin 30 seats in the keeper 32, the pivoted latch 33 returns to a position above the pin 31 to prevent the gate from being pushed open from above center or lifted to release the pin 30 from its keeper.

The opposite guide plate 42 from whichever roller acts as the pivot retains the pivotal roller in position during the operation of the gate.

Having thus fully described my invention, what I claim as new and desire to secure by Letters Patent, is:

1. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, said gate having an upper connection and a lower shock absorbing yieldable connection with said third post, latch means between said gate and the other of said fixed posts, means for releasing said gate upon bumping of said gate below the center of said gate, and a dash pot actuated by the final movement of said gate to arrest the movement of said gate.

2. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, said gate having an upper connection and a lower shock absorbing yieldable connection with said third post, latch means between said gate and the other of said fixed posts, means for releasing said gate upon bumping of said gate below the center of said gate, a dash pot actuated by the final movement of said gate to arrest the movement of said gate, and a spring for actuating the return movement of said gate.

3. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, said gate having an upper connection and a lower shock absorbing yieldable connection with said third post, latch means between said gate and the other of said fixed posts, means for releasing said gate upon bumping of said gate below the center of said gate, and means for preventing said gate from opening by a lifting action or applying pressure to the upper portion of said gate.

4. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, roller guides on said frame, a cover over said frame and pivoted thereto, said gate having an upper connection and a lower shock absorbing yieldable connection with said third post, latch means between said gate and the other of said fixed posts, means for releasing said gate upon bumping of said gate below the center of said gate, a yoke secured to said cover, said gate engaging said yoke and rocking said cover upon final movement of said gate, a dash pot having connection with said cover and said first named fixed post for retarding and holding said gate, and a spring between said cover and post for actuating the return movement of said gate.

5. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, roller guides on said frame, said gate having an upper connection and a lower shock absorbing yieldable connection with said third post, latch means between said gate and the other of said fixed posts, and means for releasing said gate upon bumping of said gate below the center of said gate.

6. A bumper actuated two-way gate comprising a pair of fixed posts, a rigid gate between said posts, a third post having a pivotal connection at its base with one of said fixed posts, a frame secured to the top of said last named fixed post, said third post having roller connection with said frame, roller guides on said frame, said gate having an upper connection and a lower connection with said third post, latch means between said gate and the other of said fixed posts, means for releasing said gate upon bumping of said gate below the center of said gate, a dash pot actuated by the final movement of said gate to arrest the movement of said gate, and a spring for actuating the return movement of said gate.

References Cited in the file of this patent
UNITED STATES PATENTS

| | | |
|---|---|---|
| 195,273 | Harvey | Sept. 18, 1877 |
| 2,505,467 | Eilert | Apr. 25, 1950 |
| 2,691,836 | David | Oct. 19, 1954 |
| 2,693,653 | Dean | Nov. 9, 1954 |